(12) United States Patent
Xie

(10) Patent No.: US 9,291,831 B2
(45) Date of Patent: Mar. 22, 2016

(54) LIQUID CRYSTAL GRATING PANEL, STEREO DISPLAY DEVICE AND DISPLAY METHOD THEREOF

(71) Applicant: BOE Technology Group Co., Ltd., Beijing (CN)

(72) Inventor: Hongjun Xie, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 188 days.

(21) Appl. No.: 13/960,144

(22) Filed: Aug. 6, 2013

(65) Prior Publication Data

US 2014/0063383 A1    Mar. 6, 2014

(30) Foreign Application Priority Data

Aug. 31, 2012  (CN) .......................... 2012 1 0319912

(51) Int. Cl.
| | |
|---|---|
| G02F 1/1335 | (2006.01) |
| G02B 27/22 | (2006.01) |
| H04N 13/04 | (2006.01) |
| G02B 27/26 | (2006.01) |

(52) U.S. Cl.
CPC ........ *G02B 27/2228* (2013.01); *G02B 27/2214* (2013.01); *G02B 27/26* (2013.01); *H04N 13/0409* (2013.01)

(58) Field of Classification Search
CPC ........................ G02B 27/2214; G02B 27/2228
USPC .......................................................... 349/15
See application file for complete search history.

(56) References Cited

U.S. PATENT DOCUMENTS

| | | | |
|---|---|---|---|
| 2007/0183015 A1 | 8/2007 | Jacobs et al. | |
| 2009/0225243 A1 | 9/2009 | Kim et al. | |
| 2011/0157171 A1 | 6/2011 | Lin | |
| 2011/0164194 A1 | 7/2011 | Robinson et al. | |
| 2011/0242442 A1* | 10/2011 | Lee et al. | 349/15 |
| 2012/0105750 A1* | 5/2012 | Yoon et al. | 349/15 |
| 2013/0107146 A1* | 5/2013 | Kim et al. | 349/15 |
| 2013/0286168 A1 | 10/2013 | Park et al. | |
| 2014/0192172 A1 | 7/2014 | Kang et al. | |

FOREIGN PATENT DOCUMENTS

| | | |
|---|---|---|
| TW | 201122645 A | 7/2011 |
| WO | 2012044130 A2 | 5/2012 |
| WO | 2012093849 A2 | 12/2012 |

OTHER PUBLICATIONS

First Chinese Office Action Appln. No. 201210319912.6; Dated Sep. 25, 2015.
Extended European Search Report Appln. No. 13180106.0—1902 / 2717586; Dated Nov. 26, 2015.

* cited by examiner

*Primary Examiner* — Thanh-Nhan P Nguyen
(74) *Attorney, Agent, or Firm* — Ladas & Parry LLP

(57) ABSTRACT

A liquid crystal grating panel, a stereo display device and a display method thereof are disclosed. The liquid crystal grating panel comprises an upper polarizer, an upper substrate, a lower substrate, a first electrode, a second electrode, a third electrode and liquid crystals; the third electrode is separated from the first electrode through an insulating layer; the liquid crystals are disposed between the upper substrate and the lower substrate; the first electrode is used for generating an electric field with the second electrode at first frame scanning periods of image scanning to form a first grating; and the third electrode is used for generating an electric field with the second electrode at second frame scanning periods of image scanning to form a second grating.

10 Claims, 4 Drawing Sheets

1: Odd Sub-frame of Odd Frame;
2: Even Sub-frame of Odd Frame;
3: Odd Frame

LIQUID CRYSTAL GRATING PANEL, STEREO DISPLAY DEVICE AND DISPLAY METHOD THEREOF

CROSS REFERENCE TO RELATED APPLICATIONS

This application claims priority from Chinese National Application No. 201210319912.6 filed on Aug. 31, 2012, the contents of which are incorporated herein by reference.

TECHNICAL FIELD

The disclosure relates to a liquid crystal grating panel, a stereo display device and a display method thereof.

BACKGROUND

The naked-eye stereo display types commonly used in the current industry include lenticular lens grating type, liquid crystal lens array type, liquid crystal grating type and so on.

The liquid crystal grating type stereo display device has the characteristics of controllable grating, capability of switching of 2D/3D and the like. In a liquid crystal grating, liquid crystals in voltage-applied regions are subjected to vertical arrangement and thus do not have optical rotation activity while liquid crystals in voltage-not-applied regions are twisted and thus have optical rotation activity. When light with different polarization directions passes through a linear polarizer, light of which the polarization direction is the same as that of the linear polarizer travels through the linear polarizer but light of which the direction is perpendicular to the linear polarizer is blocked. Therefore, the liquid crystal grating type stereo display method belongs to a parallax barrier method designed in such a way that the left eye and the right eye of a viewer see different images and the stereoscopic effect is produced after the images are subjected to analysis and synthesis in the viewer's brain. Herein, the phenomenon that the left eye and the right eye see different images refers to that the left eye and the right eye respectively see images displayed by pixels in odd columns and even columns of a display panel.

A conventional liquid crystal grating type stereo display device generally comprises a backlight module, a display panel and a liquid crystal grating panel. The structure of the conventional liquid crystal grating panel is as illustrated in FIG. 1. The liquid crystal grating panel is configured to produce a parallax barrier, so that the left eye and the right eye of the viewer respectively see a left eye image displayed by odd pixel columns (that is, the odd pixel columns together present the left eye image) and a right eye image displayed by even pixel columns (that is, the even pixel columns together present the left eye image), without crosstalk produced as much as possible. As illustrated in FIG. 1, the liquid crystal grating panel comprises an upper polarizer 1, an upper substrate 2, a first electrode 3, liquid crystals 4, a second electrode 5, a lower substrate 6 and a lower polarizer 7. Moreover, as illustrated in FIG. 1, a TN (Twisted Nematic) panel for a liquid crystal grating only includes two layers of electrodes, i.e., the first electrode 3 and the second electrode 5, respectively disposed on both sides of the liquid crystals and between the upper substrate 2 and the lower substrate 6. Due to the voltage difference across the two layers of electrodes, the electric field distribution is produced in such a way that the liquid crystals are twisted.

As the left eye and the right eye respectively see the left eye image displayed by the odd columns of the display panel and the right eye image displayed by pixels in the even columns of the display panel, the resolution of the stereo display device is lower than that of a common flat display device and is generally half of that of the common flat display device. That is to say, the naked-eye stereo display method achieves the stereoscopic effect while reducing display resolution, and thus the stereo display device has the problems of lower resolution, poor picture effect and the like.

SUMMARY

The disclosure provides a liquid crystal grating panel, a stereo display device and a display method thereof, capable of achieving the stereoscopic effect on the premise of guaranteeing the resolution.

An aspect of the disclosure provides a liquid crystal grating panel comprising: an upper substrate; a lower substrate; liquid crystals disposed between the upper substrate and the lower substrate; an upper polarizer arranged on an internal surface or an external surface of the upper substrate; a first electrode arranged on the internal surface of the upper substrate, the first electrode including a plurality of strip electrodes arranged in parallel and at intervals; a third electrode arranged on a different layer from the first electrode and separated from the first electrode through an insulating layer, the third electrode including a plurality of strip electrodes arranged in parallel and at intervals, and the strip electrodes of the third electrode and the strip electrodes of the first electrode being offset relative to each other in a horizontal direction; and a second electrode arranged on an internal surface of the lower substrate; or a first electrode arranged on an internal surface of the lower substrate, the first electrode including a plurality of strip electrodes arranged in parallel and at intervals; a third electrode arranged on a different layer from the first electrode and separated from the first electrode through an insulating layer, the third electrode including a plurality of strip electrodes arranged in parallel and at intervals, and the strip electrodes of the third electrode and the strip electrodes of the first electrode being offset relative to each other in the horizontal direction; and a second electrode arranged on the internal surface of the upper substrate. The first electrode are used for generating an electric field with the second electrode at first frame scanning periods of image scanning to form a first grating for transmitting images in odd pixel columns of a display panel to the left eye of a user and transmitting images in even pixel columns of the display panel to the right eye of the user; the third electrode are used for generating an electric field with the second electrode at second frame scanning periods of image scanning to form a second grating for transmitting images in the even pixel columns of the display panel to the left eye of the user and transmitting the images in the odd pixel columns of the display panel to the right eye of the user; and the first frame scanning periods and the second frame scanning periods of image scanning are alternated.

Another aspect of the disclosure provides a stereo display device, comprising a display panel and the aforesaid liquid crystal grating panel.

Further another aspect of the disclosure provides a display method for the aforesaid stereo display device, image scanning periods include first frame scanning periods and second frame scanning periods, image source data include data for odd pixel columns of a left eye image, data for even pixel columns of the left eye image, data for odd pixel columns of a right eye image, and data for even pixel columns of the right eye image, and the method comprises the following steps of: at the first frame scanning periods of image scanning, loading the data for the odd pixel columns of the left eye image among the image source data into pixels in the odd columns of the display panel, loading the data for the even pixel columns of the right eye image into pixels in the even columns of the display panel, controlling the first electrode and the second electrode of the liquid crystal grating panel to form a first grating for transmitting images in the odd pixel columns of the display panel to the left eye of a user and transmitting images in the even pixel columns of the display panel to the right eye of the user; and at the second frame scanning periods of image scanning, loading the data for the even pixel columns of the left eye image among the image source data into pixels in the even columns of the display panel, loading the data for the odd pixel columns of the right eye image into pixels in the odd columns of the display panel, and controlling the third electrode and the second electrode of the liquid crystal grating panel to form a second grating for transmitting images in the even pixel columns of the display panel to the left eye of the user and transmitting images in the odd pixel columns of the display panel to the right eye of the user.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

Figure 1:
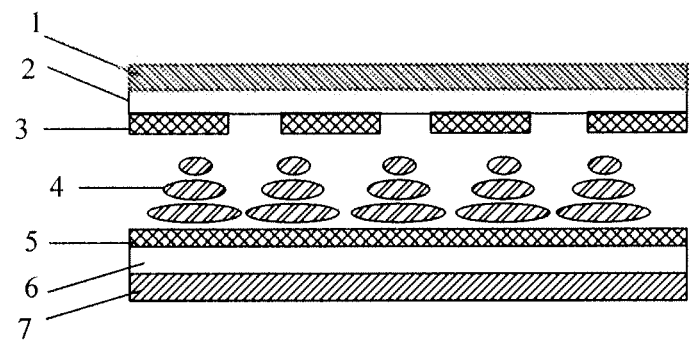
FIG. 1 is a schematic structural view of a conventional liquid crystal grating panel.

REFERENCE NUMERALS 1-upper polarizer; 2-upper substrate; 3-first electrode; 4-liquid crystal; 5-second electrode; 6-lower substrate; 7-lower polarizer; 8-insulating layer; 9-third electrode; 10-liquid crystal grating panel; 20-display panel; 30-backlight module.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure.

Unless otherwise defined, all the technical and scientific terms used herein have the same meanings as commonly understood by one of ordinary skill in the art to which the present disclosure belongs. The phrases "first," "second," etc., which are used in the description and the claims of the present application for disclosure, are not intended to indicate any sequence, amount or importance, but distinguish various components. Also, the terms such as "a," "an," "the," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In an embodiment of the disclosure, a third electrode is additionally arranged between a first electrode and liquid crystals of a liquid crystal grating panel and separated from the first electrode through an insulating layer; the liquid crystals are disposed between the third electrode and a second electrode; the first electrode is used for generating an electric field with the second electrode at an odd frame scanning period of image scanning to form a first grating; and the third electrode is used for generating an electric field with the second electrode at an even frame scanning period of image scanning to form a second grating. Moreover, odd frame scanning periods and even frame scanning periods are respectively examples of first frame scanning periods and second frame scanning periods arranged alternately and at intervals over time.

Figure 2A:
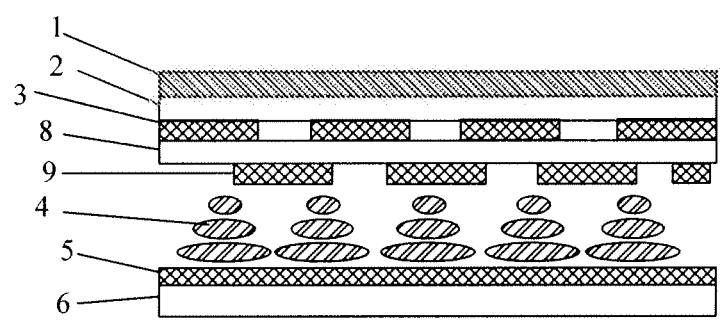
FIGS. 2a, 2b and 2c are three schematic structural views of a liquid crystal grating panel provided by the disclosure.
Figure 2B:
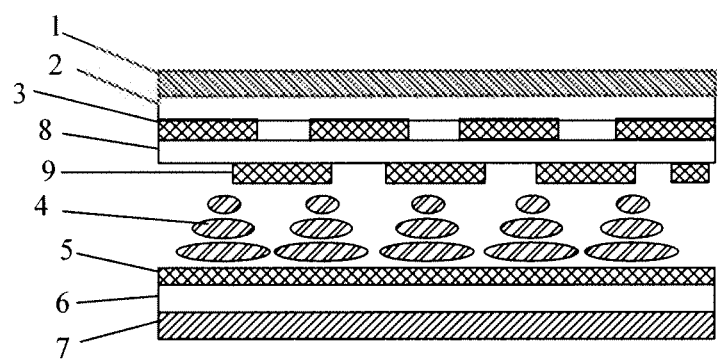

In one embodiment of the disclosure, a liquid crystal grating panel is provided. FIGS. 2a and 2b illustrate two examples, both comprising an upper polarizer 1, an upper substrate 2, a first electrode 3, a third electrode 9, a lower substrate 6, a second electrode 5, and liquid crystals 4; the first electrode 3 is arranged on the substrate surface of one side of the upper substrate 2 adjacent to the liquid crystals 4; the third electrode 9 is arranged on a different layer from the first electrode 3 and separated from the first electrode 3 through an insulating layer 8; the second electrode 5 is arranged on the substrate surface of one side of the lower substrate 6 adjacent to the liquid crystals 4; and the liquid crystals 4 are disposed between the third electrode 9 and the second electrode 5. The example as illustrated in FIG. 2b may further comprise a lower polarizer 7 arranged on the internal surface or the external surface of the lower substrate 6, besides the above structures.

The first electrode 3 is used for generating an electric field with the second electrode 5 at an odd frame scanning period of image scanning to form a first grating; and the third electrode 9 is used for generating an electric field with the second electrode 5 at an even frame scanning period of image scanning to form a second grating.

In another embodiment, image scanning periods include odd frame scanning periods and even frame scanning periods. Moreover, when black frames are presented at the even frame scanning periods, the odd frame scanning periods include odd sub-frame scanning periods and even sub-frame scanning periods arranged at intervals. Therefore, the image scanning periods include the odd sub-frame scanning periods, black frame scanning periods and the even sub-frame scanning periods which are respectively examples of first, third and second frame scanning periods in the embodiment, wherein the black frame scanning periods are inserted between the odd sub-frame scanning periods and the even sub-frame scanning periods, which are arranged alternately and at intervals, to separate the two scanning periods from each other.

The first electrode 3 is arranged on one side of the upper substrate 1 adjacent to liquid crystals 4; and the third electrode 9 is arranged below the first electrode 3 and separated from the first electrode 3 through the insulating layer 8. Correspondingly, the second electrode 5 is arranged on one side of the lower substrate 6 adjacent to the liquid crystals 4.

Figure 4:
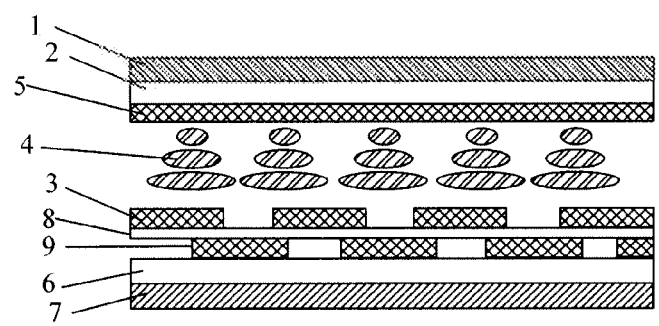
FIG. 4 is another schematic structural view of the liquid crystal grating panel provided by the disclosure.
Figure 5:
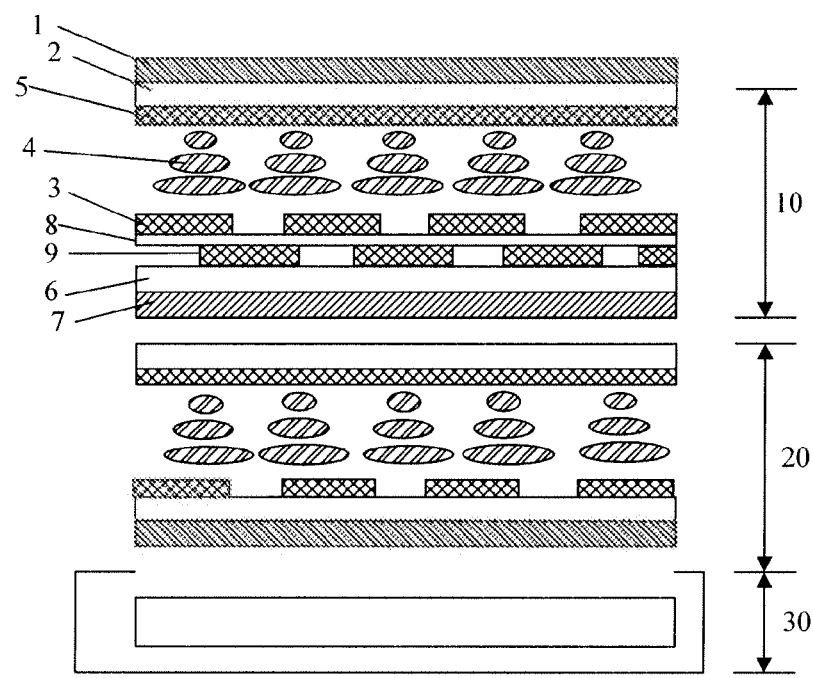
FIG. 5 is a schematic structural view of a stereo display device comprising the liquid crystal grating panel as illustrated in FIG. 4.

Or, as illustrated in FIG. 4, a first electrode 3 is arranged on one side of a lower substrate 6 adjacent to liquid crystals 4; and a third electrode 9 is disposed below the first electrode 3 and separated from the first electrode 3 through an insulating layer 8. Correspondingly, a second electrode 5 is arranged on one side of an upper substrate 2 adjacent to the liquid crystals 4.

As shown, the first electrode 3 includes a plurality of transparent electrodes disposed on the same layer and arranged in parallel and at intervals; the third electrode 9 includes a plurality of transparent electrodes disposed on the same layer and arranged in parallel and at intervals; and the transparent electrodes of the third electrode 9 and the transparent electrodes of the first electrode 3 are shifted (or offset) relative to each other in the horizontal direction.

The first electrode 3 is used together with the second electrode 5 to form a first grating for transmitting the image in odd pixel columns (that is, the image shown by the odd pixel columns together) of a display panel to the left eye of a user and the image in even pixel columns (that is, the image shown by the even pixel columns together) of the display panel to the right eye of the user; and the third electrode 9 is used together with the second electrode 5 to from a second grating for transmitting the image on the even pixel columns of the display panel to the left eye of the user and the images on the odd pixel columns of the display panel to the right eye of the user.

Figure 2C:
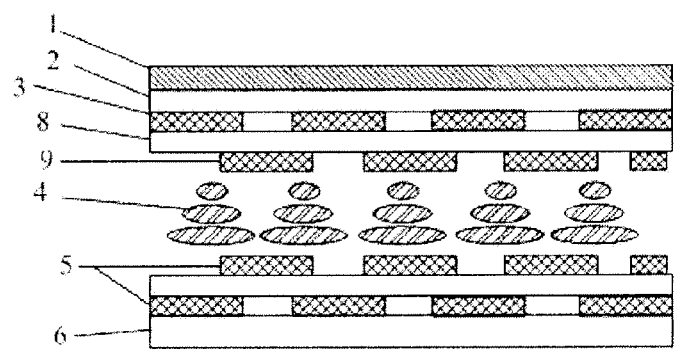

For example, the second electrode 5 may be a plate electrode or may be configured to comprise two sub-electrodes. As illustrated in FIG. 2c, the structure and position of the two sub-electrodes are the same as, for example, those of the first electrode 3 and the third electrode 9, that is, the two sub-electrodes are arranged on different layers and separated from each other through an insulating layer and meanwhile vertically aligned with the first electrode 3 and the third electrode 9 respectively.

The lower polarizer 7 may be configured according to the type of the stereo display device employing the liquid crystal grating panel. For example, when the display panel of the stereo display device is an LCD (Liquid Crystal Display) panel, the liquid crystal grating panel is arranged between the display panel and a backlight module of the stereo display device, and a lower polarizer 7 is further arranged on the internal surface or the external surface of the lower substrate 6 of the liquid crystal grating panel. When the display panel of the stereo display device is an active light-emitting display panel, the liquid crystal grating panel is arranged on a light-emitting side of the active light-emitting display panel, and a lower polarizer 7 may be further arranged on the internal surface or the external surface of the lower substrate 6 of the liquid crystal grating panel.

Figure 3:
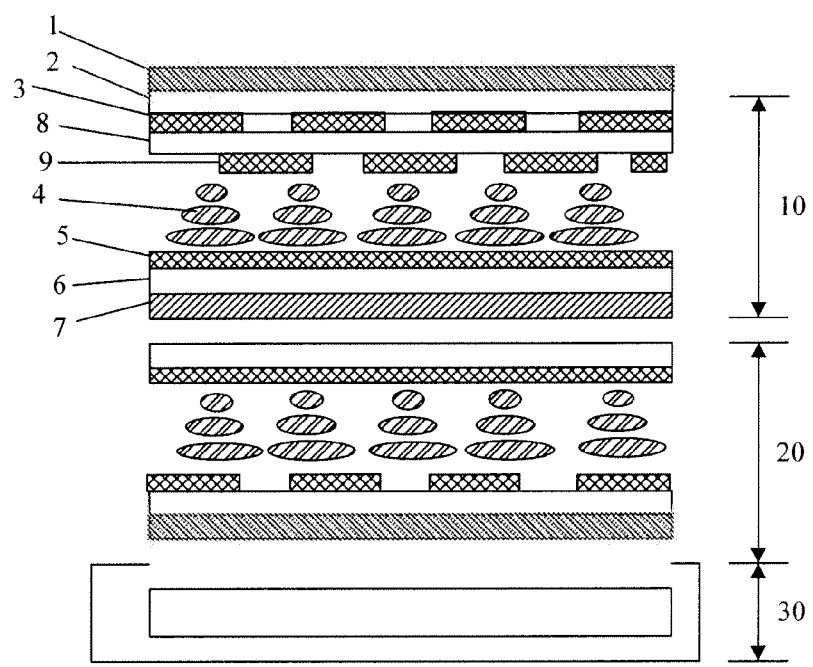
FIG. 3 is a schematic structural view of a stereo display device comprising the liquid crystal grating panel as illustrated in FIG. 2b.

An embodiment of the disclosure also provides a stereo display device comprising the liquid crystal grating panel. The stereo display device as shown in FIG. 3, comprising the liquid crystal grating panel as illustrated in FIG. 2b, will be described in detail below. In general, the stereo display device comprises a display panel and the liquid crystal grating panel. When the display panel is an LCD panel, the stereo display device may also comprise a backlight module. FIG. 3 illustrates the structure of the stereo display device comprising the three parts. As illustrated in FIG. 3, the illustrative stereo display device comprises a backlight module 30, a display panel 20 and a liquid crystal grating panel 10. The liquid crystal grating panel 10 may be arranged on a light-emitting side of the display panel 20 or between the display panel 20 and the backlight module 30. The prior arrangement is as illustrated in FIG. 3. Moreover, the backlight module 30 is used for generating an original light source, which is a source for the light for display on the display device; the display panel 20 is used for receiving image data and creating images and is a display carrier for three-dimensional images, in which a left eye image and a right eye image are displayed by odd and even pixel columns on the display panel; and the liquid crystal grating panel 10 is used for producing a parallax barrier, so that the left eye and the right eye of a viewer can see images on odd columns and even columns respectively, without crosstalk produced as much as possible.

As illustrated in FIG. 3, the liquid crystal grating panel here comprises an upper polarizer 1, an upper substrate 2, a first electrode 3, liquid crystals 4, a lower substrate 6, a second electrode 5 and a lower polarizer 7; the first electrode 3 is arranged on the substrate surface of one side of the upper substrate 2 adjacent to the liquid crystals 4, and the second electrode 5 is arranged on the substrate surface of one side of the lower substrate 6 adjacent to the liquid crystals 4. Moreover, the liquid crystal grating panel further comprises a third electrode 9 which is arranged at intervals with respect to the first electrode 3 and separated from the first electrode 3 through an insulating layer 8. As the lower substrate of the liquid crystal grating panel here is provided with the lower polarizer, the upper polarizer may be not arranged on the upper substrate of the liquid crystal display panel and the lower polarizer of the liquid crystal grating panel is used as the upper polarizer of the liquid crystal display panel as well. By adoption of the proposal, the structure of the liquid crystal grating panel can be simplified and the costs can be reduced.

It should be noted that, when the display panel is an LCD panel, as light emitted from the LCD panel is linearly polarized light, the lower substrate of the liquid crystal grating panel may be also not provided with the lower polarizer 7, so that the structure of the liquid crystal grating panel can be simplified and the cost can be reduced; and when the display panel is an OLED (Organic Light Emitting Display) panel, a PDP (Plasma Display Panel) or an EPD (Electronic Paper Display) panel, as light emitted from the above display panel is not linearly polarized light, the lower substrate of the liquid crystal grating panel should be provided with the lower polarizer 7. Moreover, the upper and lower substrates of the liquid crystal grating panel in the embodiment of the disclosure may be made of glass or may be also made of plastics, quartz or another material capable of achieving corresponding technical effects.

In one embodiment, the first electrode 3 is used for generating an electric field with the second electrode 5 at an odd frame scanning period of image scanning to form a first grating; and the third electrode 9 is used for generating an electric field with the second electrode 5 at an even frame scanning period of image scanning to form a second grating.

The first electrode 3 and the third electrode 9 are data electrodes; the first electrode 3 is arranged on one side of the upper substrate 2 adjacent to the liquid crystals 4; the third electrode 9 is arranged below the first electrode 3 and separated from the first electrode 3 through the insulating layer 8; the first electrode 3 and the third electrode 9 each include a plurality of transparent electrodes disposed on the same layer and arranged in parallel and at intervals; and the second electrode 5 is a common (COM) electrode and arranged on one side of the lower substrate 6 adjacent to the liquid crystals 4.

Moreover, the structure of the liquid crystal grating panel may also be as illustrated in FIG. 4. The structure as illustrated in FIG. 4 is basically the same as that of the liquid crystal grating panel as illustrated in FIG. 2a or 2b; and the differences are as follows: the first electrode 3 and the third electrode 9 are data electrodes, the first electrode 3 is arranged on one side of the lower substrate 6 adjacent to the liquid crystals 4, the third electrode 9 is disposed below the first electrode 3 and separated from the first electrode 3 through the insulating layer 8, the first electrode 3 and the third electrode 9 each include a plurality of transparent electrodes disposed on the same layer and arranged in parallel and at intervals, and the second electrode 5 is a COM electrode and arranged on one side of the upper substrate 2 adjacent to the liquid crystals 4.

Correspondingly, an embodiment of the disclosure also provides a stereo display device comprising the liquid crystal grating panel as illustrated in FIG. 4. Other parts of the structure of the stereo display device are the same as those of the stereo display device as illustrated in FIG. 3 except the liquid crystal grating panel.

The working process of the stereo display device in one embodiment will be further described below with reference to FIGS. 6 to 8.

Figure 6:
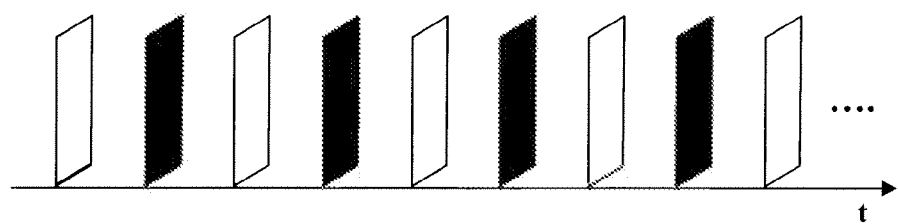
FIG. 6 is a schematic diagram illustrating frame types, displayed in sequence according to the frame scanning periods, of the liquid crystal grating panel provided by the disclosure.

As illustrated in FIG. 6, frames displayed in sequence of the display device are divided into different frame types according to the frame scanning periods. Firstly, the frame scanning periods are divided into odd frame scanning periods and even frame scanning periods; and secondly, all the odd frame scanning periods are further divided in sequence into odd sub-frame scanning periods and even sub-frame scanning periods arranged at intervals. In order to clear scanned image contents of the prior frame and avoid crosstalk when an image of the next frame is not completely scanned, black frames are inserted into all the even frame scanning periods of the frame scanning periods for scanning. Therefore, as illustrated in FIG. 6, the horizontal axis represents the time "t"; the odd frame scanning periods include the odd sub-frame scanning periods and the even sub-frame scanning periods arranged at intervals; the inserted black frames are scanned at the even frame scanning periods, which can be called as black frame scanning periods accordingly; and the odd sub-frame scanning periods, the even sub-frame scanning periods and the black frame scanning periods are respectively examples of first, second and third frame scanning periods; as result, the black frame scanning periods are inserted into the odd sub-frame scanning periods and the even sub-frame scanning periods, which are arranged alternately and at intervals over time.

The first electrode 3 and the third electrode 9 operate alternately in the time sequence (temporally). As shown above, the inserted black frames are displayed at all the even frame scanning periods, at each of which a black screen (black image) is displayed, and desired images are all displayed at the odd frame scanning periods. All the electrodes are subjected to charging and discharging at the black frame scanning periods while operating stably at the odd frame scanning periods. For example, at an odd sub-frame scanning period, an electric field is generated between the first electrode 3 and the second electrode 5, the third electrode 9 is subjected to full discharging, and at this point a first grating is formed. At an even frame scanning periods, the first electrode 3 is subjected to discharging and the third electrode 9 is subjected to charging. At an even sub-frame scanning periods, an electric field is generated between the third electrode 9 and the second electrode 3, the first electrode 3 is subjected to full discharging, and at this point a second grating is formed.

Figure 7:
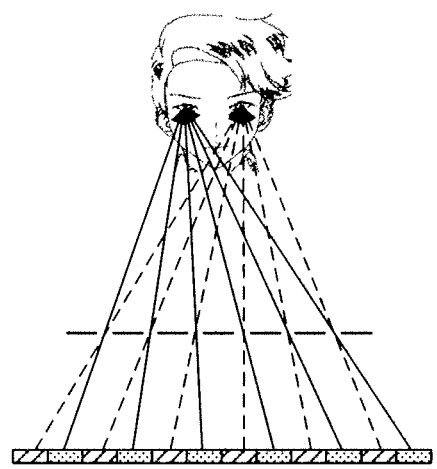
FIG. 7 is a schematic diagram illustrating images seen by the left eye and the right eye when a first grating in the liquid crystal grating panel provided by the disclosure functions.
Figure 8:
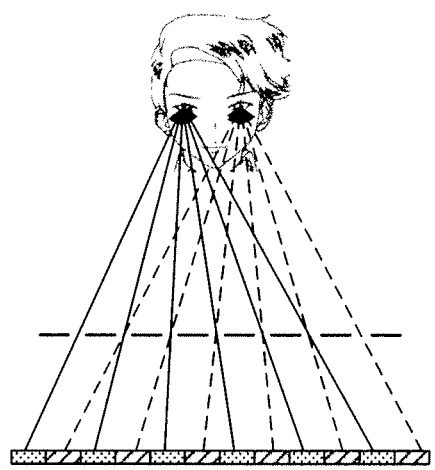
FIG. 8 is a schematic diagram illustrating images seen by the left eye and the right eye when a second grating in the liquid crystal grating panel provided by the disclosure functions.

Here, the first electrode 3 and the third electrode 9 each include a plurality of transparent electrodes arranged in parallel and at intervals; the transparent electrodes of the third electrode 9 and the transparent electrodes of the first electrode 3 are shifted (offset) relative to each other in the plane direction of the substrates; the parameters of the first electrode 3 and the third electrode 9 may be determined according to optical design, and respective width, spacing and position of the first electrode 3 and the third electrode 9 may be determined by optical simulation and computing; and the position parameter must be configured in such a way that the first grating and the second grating generated in the finally determined liquid crystal grating panel can achieve the effects of a left eye image and a right eye image as illustrated in FIGS. 7 and 8 respectively during the operation.

For example, at the odd sub-frame scanning periods, the first grating formed by the first electrode 3 and the second electrode 5 functions and transmits images in odd pixel columns of the display panel to the left eye of a user and images in even pixel columns of the display panel to the right eye of the user. As illustrated in FIG. 7, the left eye of the user sees the images in odd pixel columns of the display panel and the right eye of the user sees the images in even pixel columns of the display panel. Moreover, for example, at the even sub-frame scanning periods, the second grating formed by the third electrode 9 and the second electrode 5 functions and transmits the images in even pixel columns of the display panel to the left eye of the user and the images in odd pixel columns of the display panel to the right eye of the user. As illustrated in FIG. 8, the left eye of the user sees the images in even pixel columns of the display panel and the right eye of the user sees the images in odd pixel columns of the display panel.

Furthermore, for example, at the odd frame scanning periods of image scanning, the display panel loads data for odd pixel columns of the left eye image among image source data into pixels in odd columns thereof for display and loads data for even pixel columns of the right eye image among the image source data into pixels in even columns thereof for display; and at the even frame scanning periods of image scanning, the display panel loads data for even pixel columns of the left eye image among the image source data into pixels in even columns thereof for display and loads data for odd pixel columns of the right eye image among the image source data into pixels in odd columns thereof for display.

Therefore, the full-resolution stereo display effect can be achieved by the temporally alternative operating of the first grating and the second grating together with the display control of the display panel.

It should be noted that, at the odd sub-frame scanning periods of image scanning, the display panel may also load the data for the odd pixel columns of the left eye image among the image source data into pixels in even columns thereof for display and loads the data for the even pixel columns of the left eye image among the image source data into pixels in odd columns thereof for display. Or at the even sub-frame scanning periods of image scanning, the display panel may also load the data for the even pixel columns of the left eye image among the image source data into pixels in odd columns thereof for display and loads the data for the odd pixel columns of the right eye image among the image source data into pixels in even columns thereof for display.

The embodiment of the stereo display method based on the stereo display device will be described in detail below. In one embodiment, the method comprises the following steps 901 and 902.

Step 901: at an odd frame scanning period of image scanning, loading data for odd pixel columns of a left eye image among image source data into pixels in odd columns of a display panel, loading data for even pixel columns of a right eye image into pixels in even columns of the display panel, and controlling a first electrode and a second electrode of a liquid crystal grating panel to form a first grating.

For example, as illustrated in FIG. 7, the first grating transmits images displayed by the pixels in the odd columns of the display panel to the left eye of a user and images displayed by pixels in the even columns of the display panel to the right eye of the user. That is to say, due to the first grating, the left eye of the user can see the images displayed by the pixels in the odd columns of the display panel and the right eye can see the images displayed by the pixels in the even columns of the display panel. At this point, the data for the odd pixel columns of the left eye image among the image source data are displayed by the pixels in the odd columns of the display panel, and the data for the even pixel columns of the right eye image among the image source data are displayed by the pixels in the even columns of the display panel.

Step 902: at an even frame scanning period of image scanning, loading data for even pixel columns of the left eye image among the image source data into pixels in even columns of the display panel, loading data for odd pixel columns of the right eye image into pixels in odd columns of the display panel, and controlling a third electrode and the second electrode of the liquid crystal grating panel to form a second grating.

For example, as illustrated in FIG. 8, the second grating transmits images displayed by the pixels in the even columns of the display panel to the left eye of the user and images displayed by the pixels in the odd columns of the display panel to the right eye of the user. That is to say, due to the second grating, the left eye of the user can see the images displayed by the pixels in the even columns of the display panel and the right eye can see the images displayed by the pixels in the odd columns of the display panel. At this point, the data for the even pixel columns of the left eye image among the image source data are displayed by the pixels in the even columns of the display panel, and the data for the odd pixel columns of the right eye image among the image source data are displayed by the pixels in the odd columns of the display panel.

In summary, the images received by the left eye and the right eye at different scanning periods in the method of the embodiment are as follows:

| Time Axis | Images Received by Left Eye | Images Received by Right Eye |
|---|---|---|
| Odd Frame Scanning Period | Odd pixel columns of a left eye image | Even pixel columns of a right eye image |
| Even Frame Scanning Period | Even pixel columns of a left eye image | Odd pixel columns of a right eye image |

In another embodiment, black frames may be inputted into a display panel at even frame scanning periods of image scanning, and odd frame scanning periods of image scanning include odd sub-frame scanning periods and even sub-frame scanning periods arranged at intervals. Therefore, image scanning periods include the odd sub-frame scanning periods, black frame scanning periods, and the even sub-frame scanning periods, and image source data include data for odd pixel columns of a left eye image, data for even pixel columns of the left eye image, black screen data, data for odd pixel columns of a right eye image, and data for even pixel columns of the right eye image. Correspondingly, at an odd sub-frame scanning period of image scanning, the method loads the data for the odd pixel columns of the left eye image among the image source data into pixels in odd columns of the display panel and the data for the even pixel columns of the right eye image into pixels in even columns of the display panel. At a black frame scanning period of image scanning, the method loads the black screen data among the image source data into pixels in both odd columns and even columns of the display panel, and controls the first electrode for discharging and the second electrode for charging. At an even sub-frame scanning periods of image scanning, the method loads the data for the even pixel columns of the left eye image among the image source data into pixels in even columns of the display panel and the data for the odd pixel columns of the right eye image into pixels in odd columns of the display panel.

In summary, the images received by the left eye and the right eye at different scanning periods in the method of the embodiment are as follows:

| Time Axis | Images Received by Left Eye | Images Received by Right Eye |
|---|---|---|
| Odd Sub-frame Scanning Period | Odd pixel columns of a left eye image | Even pixel columns of a right eye image |
| Even Sub-frame Scanning Period | Even pixel columns of a left eye image | Odd pixel columns of a right eye image |

As can be seen from the above table, the refresh rate of the images received by the left eye and the right eye is one-fourth of the frame scanning frequency. Therefore, when the frame scanning frequency of an LCD is 120 Hz or 240 Hz, the refresh rate of 30 Hz or 60 Hz under the stereo display state can be obtained correspondingly. Moreover, the problem of reduced refresh rate under the stereo display state can also be solved by adoption of the frequency multiplication proposal.

The stereo display device provided by the embodiment of the disclosure may be an LCD TV, an LCD, an OLED TV, an OLED, a Plasma Display Panel (PDP) TV, a PDP, an EPD and other display devices.

In such a manner, the full display of 3D signals on the display panel can be achieved by the three-layer design of the space structure of the electrodes in the liquid crystal grating panel together with the input positions of image data sources which is controlled at different scanning periods. Therefore, data received by the left eye and the right eye of the user are not subjected to any compression or loss, that is, the left eye can resolve the left eye image having the same resolution with the display panel and the right eye can resolve the right eye image having the same resolution with the display panel, and consequently, the full-resolution stereo display effect can be achieved.

The embodiments of the disclosure have been described above and are not intended to limit the scope of protection of the disclosure. The scope of protection of the disclosure is only limited by the appended claims.

What is claimed is:

1. A liquid crystal grating panel, comprising:
   an upper substrate;
   a lower substrate;
   liquid crystals disposed between the upper substrate and the lower substrate;
   an upper polarizer arranged on an internal surface or an external surface of the upper substrate;
   a first electrode arranged on the internal surface of the upper substrate, the first electrode including a plurality of strip electrodes arranged in parallel and at intervals; a third electrode arranged on a different layer from the first electrode and separated from the first electrode through an insulating layer, the third electrode including a plurality of strip electrodes arranged in parallel and at intervals, and the strip electrodes of the third electrode and the strip electrodes of the first electrode being offset relative to each other in a horizontal direction; and a second electrode arranged on an internal surface of the lower substrate; or
   a first electrode arranged on an internal surface of the lower substrate, the first electrode including a plurality of strip electrodes arranged in parallel and at intervals; a third electrode arranged on a different layer from the first electrode and separated from the first electrode through an insulating layer, the third electrode including a plurality of strip electrodes arranged in parallel and at intervals, and the strip electrodes of the third electrode and the strip electrodes of the first electrode being offset relative to each other in the horizontal direction; and a second electrode arranged on the internal surface of the upper substrate;
   wherein the first electrode are configured for generating an electric field with the second electrode at first frame scanning periods of image scanning to form a first grating for transmitting images in odd pixel columns of a display panel to the left eye of a user and transmitting images in even pixel columns of the display panel to the right eye of the user;
   the third electrode are configured for generating an electric field with the second electrode at second frame scanning periods of image scanning to form a second grating for transmitting images in the even pixel columns of the display panel to the left eye of the user and transmitting the images in the odd pixel columns of the display panel to the right eye of the user; and
   the first frame scanning periods and the second frame scanning periods of image scanning are alternated.

2. The liquid crystal grating panel according to claim 1, wherein the second electrode is a plate electrode; or
   the second electrode comprises two sub-electrodes which are arranged on different layers and separated from each other through an insulating layer and have a same shape and are vertically aligned with the first electrode and the third electrode respectively.

3. A stereo display device comprising a display panel and the liquid crystal grating panel according to claim 1.

4. The stereo display device according to claim 3, wherein the stereo display device further comprises a backlight module when the display panel is an LCD (Liquid Crystal Display) panel; and
   the liquid crystal grating panel is arranged on a light-emitting side of the display panel or between the display panel and the backlight module.

5. The stereo display device according to claim 4, wherein a lower polarizer is arranged on the internal surface or an external surface of the lower substrate of the liquid crystal grating panel when the liquid crystal grating panel is arranged between the display panel and the backlight module.

6. The stereo display device according to claim 3, wherein when the display panel is an active light-emitting display panel, the liquid crystal grating panel is arranged on a light-emitting side of the active light-emitting display panel and a lower polarizer is also arranged on the internal surface or an external surface of the lower substrate of the liquid crystal grating panel.

7. A display method for the stereo display device according to claim 3, image scanning periods including first frame scanning periods and second frame scanning periods, image source data including data for odd pixel columns of a left eye image, data for even pixel columns of the left eye image, data for odd pixel columns of a right eye image, and data for even pixel columns of the right eye image, the method comprising the following steps of:
   at the first frame scanning periods of image scanning, loading the data for the odd pixel columns of the left eye image among the image source data into pixels in the odd columns of the display panel, loading the data for the even pixel columns of the right eye image into pixels in the even columns of the display panel, controlling the first electrode and the second electrode of the liquid crystal grating panel to form a first grating for transmitting images in the odd pixel columns of the display panel to the left eye of a user and transmitting images in the even pixel columns of the display panel to the right eye of the user; and
   at the second frame scanning periods of image scanning, loading the data for the even pixel columns of the left eye image among the image source data into pixels in the even columns of the display panel, loading the data for the odd pixel columns of the right eye image into pixels in the odd columns of the display panel, and controlling the third electrode and the second electrode of the liquid crystal grating panel to form a second grating for transmitting images in the even pixel columns of the display panel to the left eye of the user and transmitting images in the odd pixel columns of the display panel to the right eye of the user.

8. The display method according to claim 7, wherein the image scanning periods further include third frame scanning periods inserted between the first frame scanning periods and the second frame scanning periods; the image source data further include black screen data; and black frames are inputted into the display panel at the third frame scanning periods of image scanning.

9. The display method according to claim 8, wherein the display method further comprises the steps of loading the black screen data among the image source data into pixels in odd and even columns of the display panel at the third frame scanning periods of the image scanning periods, and controlling the first electrode for discharging and the second electrode for charging.

10. The liquid crystal grating panel according to claim 1, wherein the third electrode and the first electrode are partly overlapped to each other with respect to the upper substrate.

\* \* \* \* \*